United States Patent
Jansen et al.

(10) Patent No.: US 10,241,253 B2
(45) Date of Patent: Mar. 26, 2019

(54) LIGHT BAR CONTAINING SYMMETRIC LED PLACEMENT AND METHOD OF MAKING THEREOF

(71) Applicant: GLO AB, Lund (SE)

(72) Inventors: Michael Jansen, Palo Alto, CA (US); Sheng-Min Wang, Taipei (TW)

(73) Assignee: GLO AB, Lund (SE)

( * ) Notice: Subject to any disclaimer, the term of this patent is extended or adjusted under 35 U.S.C. 154(b) by 0 days.

(21) Appl. No.: 15/592,405

(22) Filed: May 11, 2017

(65) Prior Publication Data

US 2018/0329135 A1    Nov. 15, 2018

(51) Int. Cl.
    *F21V 8/00*     (2006.01)

(52) U.S. Cl.
    CPC ......... *G02B 6/0031* (2013.01); *G02B 6/0068* (2013.01)

(58) Field of Classification Search
    CPC ............................ G02B 6/0031; G02B 6/0068
    See application file for complete search history.

(56) References Cited

U.S. PATENT DOCUMENTS

| | | | | |
|---|---|---|---|---|
| 6,550,953 | B1 * | 4/2003 | Ichikawa | G02B 6/0021 257/E25.02 |
| 2002/0167016 | A1 * | 11/2002 | Hoelen | G02B 6/0068 257/89 |
| 2004/0228127 | A1 * | 11/2004 | Squicciarini | F21K 9/00 362/240 |
| 2007/0200121 | A1 * | 8/2007 | Lankhorst | G02F 1/133603 257/79 |
| 2008/0007509 | A1 * | 1/2008 | Lankhorst | G02F 1/133603 345/102 |
| 2008/0285310 | A1 * | 11/2008 | Aylward | G02B 6/001 362/626 |
| 2010/0059767 | A1 * | 3/2010 | Kawasaki | G02B 6/0096 257/89 |
| 2010/0066943 | A1 * | 3/2010 | Akiba | G02B 6/0068 349/62 |
| 2010/0156953 | A1 * | 6/2010 | Nevitt | G02B 6/0068 345/690 |
| 2012/0170312 | A1 * | 7/2012 | Lee | G02B 6/009 362/612 |
| 2015/0085524 | A1 | 3/2015 | Wang et al. | |
| 2015/0362662 | A1 * | 12/2015 | Feng | G02B 6/0026 362/601 |

OTHER PUBLICATIONS

U.S. Appl. No. 15/353,050, filed Nov. 16, 2016, Danesh et al.
U.S. Appl. No. 15/353,100, filed Nov. 16, 2016, Jansen et la.
U.S. Appl. No. 15/502,988, filed Feb. 9, 2017, Kaneshiro et al.

* cited by examiner

*Primary Examiner* — Donald L Raleigh
(74) *Attorney, Agent, or Firm* — The Marbury Law Group PLLC (57) ABSTRACT

A light bar includes a plurality of light emitting diode (LED) clusters which extend along a lengthwise direction of the light bar from a first end of the light bar to an opposite second end of the light bar. Each LED cluster includes at least three different types of LEDs. A first LED at the first end of the light bar and a last LED at the second end of the light bar emit the same color light.

19 Claims, 5 Drawing Sheets

LIGHT BAR CONTAINING SYMMETRIC LED PLACEMENT AND METHOD OF MAKING THEREOF

FIELD

The embodiments of the present disclosure are directed generally to semiconductor light emitting devices and specifically to a light bar for an integrated back light unit, and a method of manufacturing the same.

BACKGROUND

Light emitting devices such as light emitting diodes (LEDs) are used in electronic displays, such as liquid crystal displays in laptop computers or LED televisions. Conventional LED units are fabricated by mounting LEDs to a substrate, encapsulating the mounted LEDs and then optically coupling the encapsulated LEDs to an optical waveguide, such as a light guide plate in a back light unit of a liquid crystal display. Some of the problems that conventional LED units can suffer include general lack of color uniformity across the light guide plate.

SUMMARY

According to an aspect of the present disclosure, a light bar comprising multiple instances of a repetition unit is provided. The multiple instances of the repetition unit extend along a lengthwise direction of the light bar from a first end of the light bar to an opposite second end of the light bar. The multiple instances of the repetition unit are periodically positioned, and are oriented to emit light along parallel light emission directions that are perpendicular to the lengthwise direction of the light bar. The repetition unit includes at least three types of light emitting devices. An entire sequence of all light emitting devices within the repetition unit from one end of the repetition unit to another end of the repetition unit is a symmetric sequence.

The light bar of the present disclosure can be incorporated into an integrated back light unit, which can comprise: a light guide plate optically coupled to the light bar, and a reflector located on a face of the light guide plate and including extraction features configured to direct light from the light emitting devices of the light bar along a direction substantially perpendicular to the face of the light guide plate.

Another embodiment of the present disclosure provides a light bar, comprising a plurality of light emitting diode (LED) clusters which extend along a lengthwise direction of the light bar from a first end of the light bar to an opposite second end of the light bar. Each LED cluster comprises a first-type LED configured to emit light at a first peak wavelength, a second-type LED configured to emit light at a second peak wavelength which is longer than the first peak wavelength, and a third-type LED configured to emit light at a third peak wavelength which is longer than the first and the second peak wavelengths. A first LED at the first end of the light bar and a last LED at the second end of the light bar are configured to emit the same color light.

Another embodiment of the present disclosure provides a method of making a light bar, comprising separately fabricating a plurality of light emitting diode (LED) clusters, wherein each LED cluster includes at least three different types of LEDs, and attaching the plurality of LED clusters to a support to form the light bar such that the LED clusters extend along a lengthwise direction of the light bar from a first end of the light bar to an opposite second end of the light bar, and a first LED at the first end of the light bar and a last LED at the second end of the light bar are configured to emit the same color light.

DETAILED DESCRIPTION

As discussed above, the present disclosure is directed to a light bar for an integrated back light unit, and a method of manufacturing the same, the various aspect of which are described herein in detail. Throughout the drawings, like elements are described by the same reference numerals. The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure.

As used herein, an "integrated back light unit" refers to a unit that provides the function of illumination for liquid crystal displays (LCDs) or other devices that display an image by blocking a subset of background illumination from the side or from the back. As used herein, a "light emitting device" can be any device that is capable of emitting light in the visible range (having a wavelength in a range from 400 nm to 800 nm), in the infrared range (having a wavelength in a range from 800 nm to 1 mm), or in the ultraviolet range (having a wavelength is a range from 10 nm to 400 nm). The light emitting devices of the present disclosure include light emitting devices as known in the art, and particularly the semiconductor light emitting diodes (LEDs) emitting light in the visible range.

As used herein, a "light emitting device assembly," or an "LED assembly" refers to an assembly in which multiple light emitting devices (e.g., LEDs) are structurally fixed with respect to a support structure, which can include, for example, a substrate, a matrix, or any other structure configured to provide stable mechanical support to the at least one light emitting device.

As used herein, a "light bar" refers to a combination of a light emitting device assembly and supporting electrical and structural elements that structurally supports the light emitting device assembly and provides electrical wiring used for operation of the light emitting device assembly.

As used herein, a "light guide unit" refers to a unit configured to guide light emitted from at least one light emitting device in a light emitting device assembly in a direction or directions that are substantially different from the initial direction of the light as emitted from the at least one light emitting device. A light guide unit of the present disclosure may be configured to reflect or scatter light along a direction different from the initial direction of the light as emitted from the at least one light emitting device. In one embodiment, the light guide unit of the present disclosure includes a light guide plate, and may be configured to reflect light along directions about the surface normal of the bottom surface of the light guide plate, i.e., along directions substantially perpendicular to the bottom surface of the light guide plate.

An integrated back light unit can include a combination of a light bar, a light guide unit, and optional components that structurally support the light bar and the light guide unit. As used herein, a direction is "substantially perpendicular" to another direction if the angle between the two directions is in a range from 75 degrees to 105 degrees.

As used herein, "red light" refers to light having a wavelength in a range from 620 nm to 750 nm. A "red-light-emitting device" or "red-light-emitting LED" refers to a device, such as an LED, having a peak emission wavelength in a range from 620 nm to 750 nm.

As used herein, "green light" refers to light having a wavelength in a range from 495 nm to 570 nm. A "green-light-emitting device" or a "green-light-emitting LED" refers to a device, such as an LED, having a peak emission wavelength in a range from 495 nm to 570 nm.

As used herein, "blue light" refers to light having a wavelength in a range from 400 nm to 495 nm. A "blue-light-emitting device" or a "blue-light-emitting LED" refers to a device, such as an LED, having a peak emission wavelength in a range from 400 nm to 495 nm.

As used herein, the "Commission Internationale de l'Eclairage model," or the "CIE model" is a color model based on human perception developed by the CIE (Commission Internationale de l'Eclairage) committee as established in 1931. As used herein, a "CIEx" is the x-coordinate value of a color in a CIE model, and a "CIEy" is the y-coordinate value of a color in the CIE model.

Figure 1A:
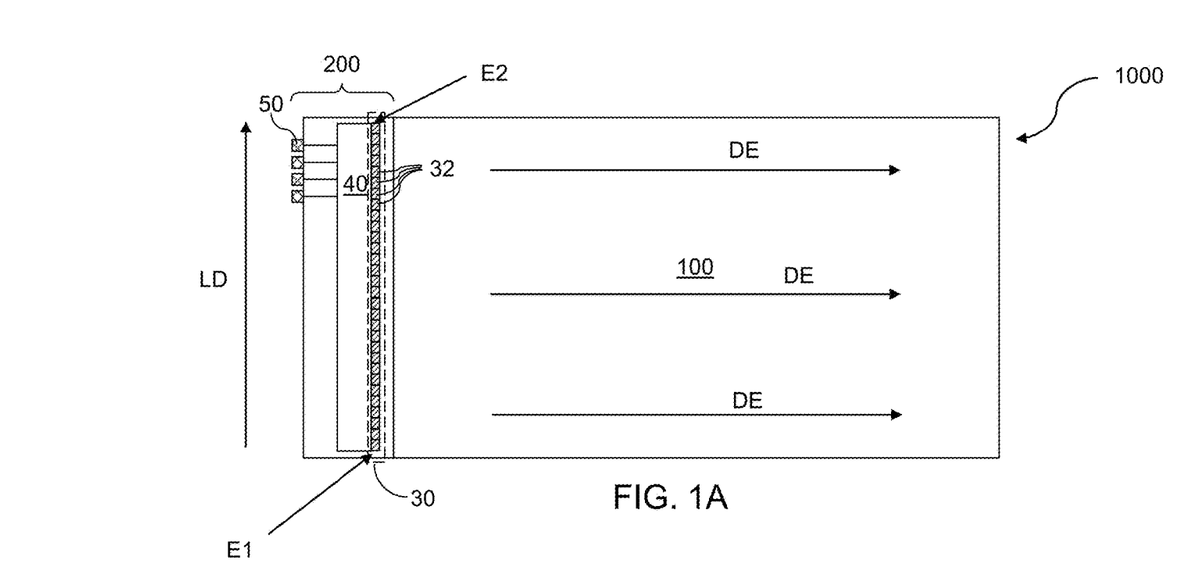
FIG. 1A is a top-down view of an exemplary integrated back light unit according to an embodiment of the present disclosure.
Figure 1B:
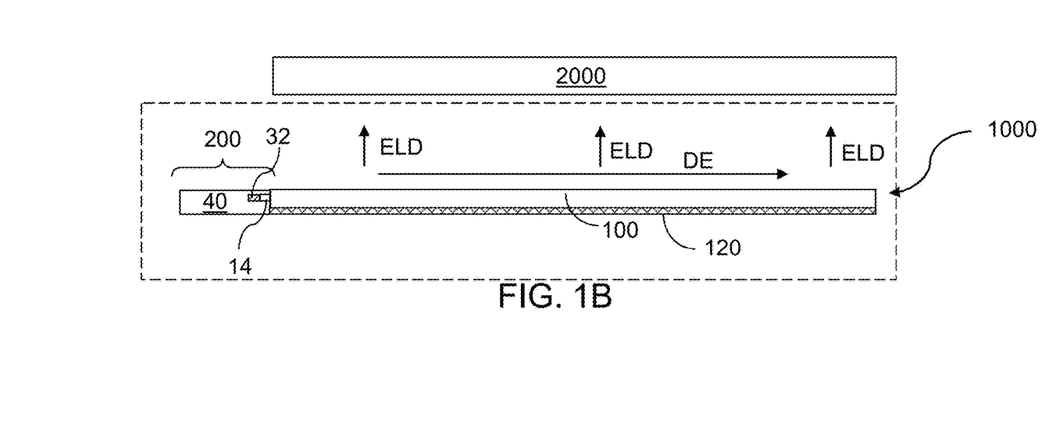
FIG. 1B is a vertical cross-sectional view of the exemplary integrated back light unit of FIG. 1A.
Figure 2:
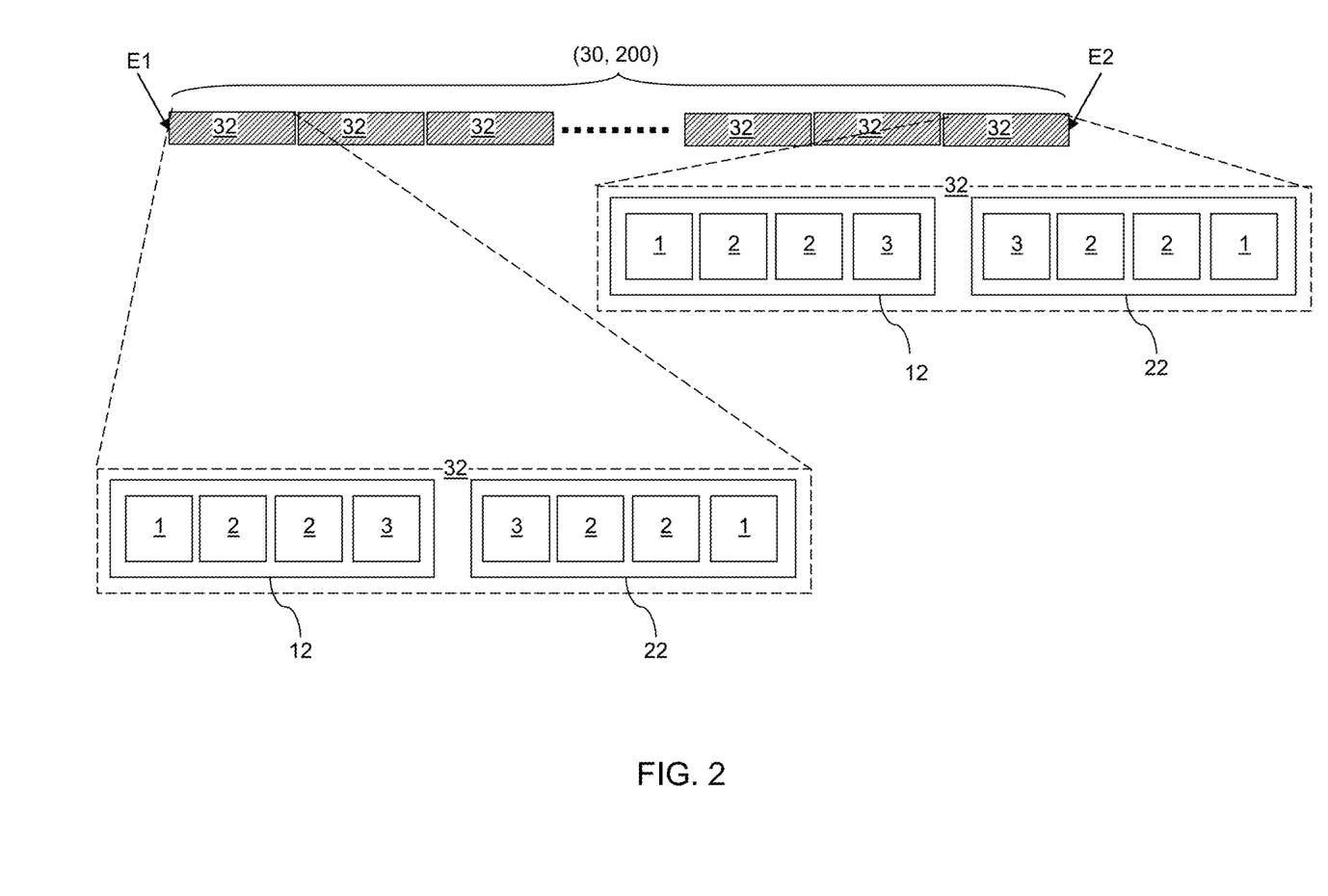
FIG. 2 is a magnified view of exemplary repetition units within a light bar according to an embodiment of the present disclosure.

Referring to FIGS. 1A, 1B, and 2, an integrated back light unit 1000 according to an embodiment of the present disclosure is illustrated, which includes a light guide plate 100 and a light bar 200. The light bar 200 includes a light emitting device assembly, such as an LED assembly 30, which includes a periodic array of multiple types of light emitting devices, such as LEDs (1, 2, 3). The multiple types of light emitting devices (1, 2, 3) can include first-type light emitting devices 1, second-type light emitting devices 2, third-type light emitting devices 3, and optionally one or more additional type light emitting devices (not shown).

According to one embodiment of the present disclosure, the light bar 200 can include multiple instances of a repetition unit 32. As used herein, a "repetition unit" refers to a smallest unit of repetition within a structure that includes multiple instances of the unit. The multiple instances of the repetition unit 32 can extend along a lengthwise direction LD of the light bar 200 from a first end E1 of the light bar 200 to a second end E2 of the light bar 200, which is the opposite end of the first end E1. In one embodiment, the multiple instances of the repetition unit 32 can be periodically positioned to form a one-dimensional periodic array that extends along the lengthwise direction LD. The multiple instances of the repetition unit 32 can be oriented to emit light along parallel light emission directions DE that are perpendicular to the lengthwise direction LD of the light bar 200.

In one embodiment, the repetition unit 32 can include at least three types of light emitting devices (1, 2, 3) such as three types of light emitting devices, four type of light emitting devices, five types of light emitting devices, and so on. Each type of light emitting devices can emit light at a respective peak wavelength that is different from the peak wavelengths of other types of light emitting devices.

In one embodiment, the entire sequence of all light emitting devices (1, 2, 3) within the repetition unit 32 from one end of the repetition unit 32 to another end of the repetition unit 32 can be a symmetric sequence. The symmetric sequence of the light emitting devices (1, 2, 3) has the effect of providing a symmetric spatial variation of spectral composition of light from each repetition unit 32 as measured along the lengthwise direction LD of the light bar 200.

Referring to FIGS. 3A-3D, additional exemplary repetition units 32 within an LED assembly 30 of a light bar 200 are illustrated according to embodiments of the present disclosure.

In some embodiments, the repetition unit 32 can include a first light emitting device cluster 12 including a first sequence of instances of the at least three types of light emitting devices (1, 2, 3), and a second light emitting device cluster 22 located adjacent to the first light emitting device cluster 12 and including a second sequence of instances of the at least three types of light emitting devices (3, 2, 1) that is a reverse sequence of the first sequence as illustrated in the exemplary repetition units 32 illustrated in FIGS. 2 and 3A-3D.

A used herein, a "cluster" refers to a group of multiple elements that are positioned in physical proximity and mechanically affixed relative positions. In one embodiment, a cluster (12, 22) can be a mini LED assembly or a mini light bar having three or four LEDs, each emitting different color light (e.g., red, green and blue) which in combination appears as white light to a human observer. The clusters (12, 22) can be fabricated separately and then attached to the same support (e.g., PCB 40) to form the assembly 30 or light bar 200 described above.

As used herein, a "sequence" refers to an ordered linear pattern of arrangement of multiple elements. As used herein, a "reverse sequence" of an original sequence refers to a sequence that is derived from the original sequence by reversing the order of elements within the original sequence. It is understood that the same direction (for example, from left to right), is employed to define all sequences provided elements of the sequences wherever definition of a sequence of elements is possible.

Figure 3A:
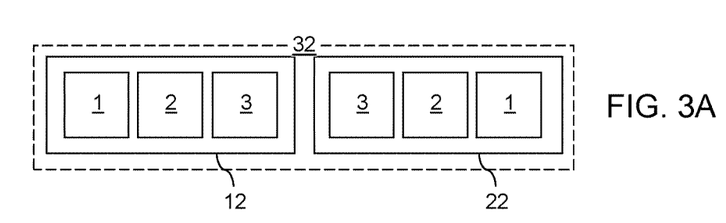
FIGS. 3A-3D illustrate additional exemplary repetition units within a light bar according to embodiments of the present disclosure.
Figure 3B:
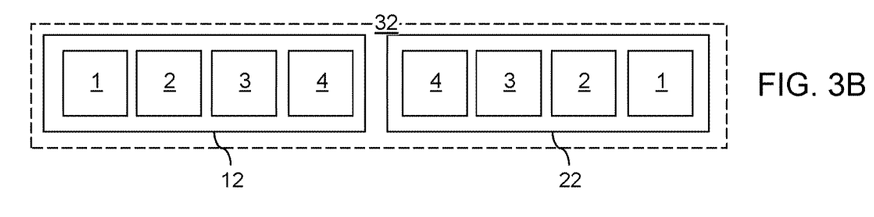
Figure 3C:
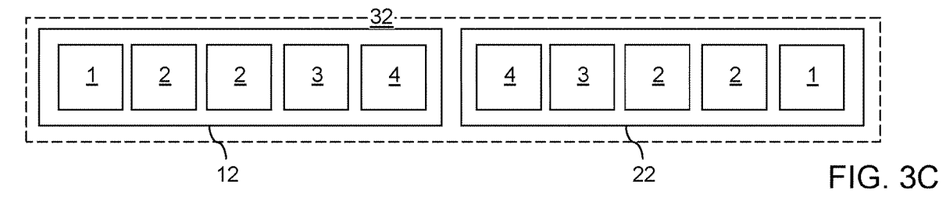

In one embodiment, the first sequence can include, in order, an instance of a first-type light emitting device 1 configured to emit light at a first peak wavelength, two instances of a second-type light emitting device 2 configured to emit light at a second peak wavelength, and an instance of a third-type light emitting device 3 configured to emit light at a third peak wavelength as illustrated in FIGS. 2 and 3C. In this case, the second sequence can include, in order, an instance of the third-type light emitting device 3, two instances of the second-type light emitting device 2, and an instance of the first-type light emitting device 1.

In some embodiments, each of the first sequence and the second sequence can include a plurality of instances of one type of light emitting device (such as the second-type light emitting device 2) among the at least three types of light emitting devices (1, 2, 3, 4) as illustrated in FIGS. 2 and 3C.

In some embodiment, each of the first sequence and the second sequence includes only a single instances of another type of light emitting device (1, 3) among the at least three types of light emitting devices (1, 2, 3) as illustrated in FIGS. 2 and 3A.

In some embodiments, each of the first sequence and the second sequence can include only a single instance of each type of light emitting device (1, 2, 3, and optionally 4) among the at least three types of light emitting devices (1, 2, 3, and optionally 4) as illustrated in FIGS. 3A and 3B.

Figure 3D:
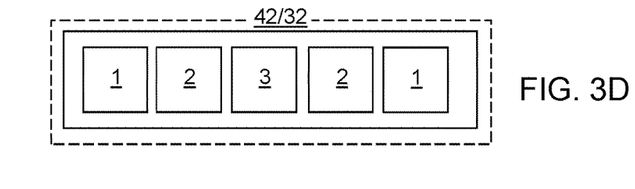

In one embodiment, the repetition unit 32 can include a light emitting device cluster 42 including the symmetric sequence as illustrated in FIG. 3D. In this case, the light emitting device cluster 42 includes all of the light emitting devices (1, 2, 3) within the repetition unit 32. The symmetric sequence can include instances of at least three types of light emitting devices (1, 2, 3).

In this embodiment, the at least three types of light emitting devices (1, 2, 3) can include, in order, a first instance of a first-type light emitting device 1 configured to emit light at a first peak wavelength, a first instance of a second-type light emitting device 2 configured to emit light at a second peak wavelength, an instance of a third-type light emitting device 3 configured to emit light at a third peak wavelength, a second instance of the second-type light emitting device 2, and a second instance of the first-type light emitting device 1.

In some embodiments, the second wavelength can be shorter than the first wavelength and longer than the third wavelength. In a non-limiting illustrative example, the first-type light emitting device 1 can be a red-light-emitting device (such as a red emitting LED), the second-type light emitting device 2 can be a green-light-emitting device (such as a green emitting LED), and the third-type light emitting device 3 can be a blue-light-emitting device (such as a blue emitting LED).

In another non-limiting illustrative example, the first-type light emitting device 1 can be a blue-light-emitting device, the second-type light emitting device 2 can be a green-light-emitting device, and the third-type light emitting device 3 can be a red-light-emitting device.

In one embodiment, the repetition unit 32 can consist of the first light emitting device cluster 12 and the second light emitting device cluster 22. Alternatively, the repetition unit 32 can consist of one cluster, as shown in FIG. 3D.

Electrical wiring can be provided to provide electrical power to light emitting devices (1, 2, 3, 4) in the LED assembly 30. The electrical wiring can be provided, for example, by a printed circuit board (PCB) 40, which may be, for example, flexible circuit board (FCB).

In some embodiments, each of the first light emitting device cluster 12 and the second light emitting device cluster 22 can include a respective set of lead structures configured to provide electrical connection to instances of the at least three types of light emitting devices (1, 2, 3, 4) therein. In this case, the lead structures can be connected to the electrical wiring embedded within the printed circuit board 40. In one embodiment, each of the first light emitting device cluster 12 and the second light emitting device cluster 22 can include a dielectric molding embedding the respective set of lead structures and the instances of the at least three types of light emitting devices (1, 2, 3, 4) therein. The two types of light emitting device clusters (12, 22) can be manufactured separately and assembled (e.g., placed and attached) in an alternating sequence on a printed circuit board 40 to form a light emitting device assembly 30. Each cluster can comprise a LED cluster which includes at least three different types of LEDs. The plurality of LED clusters (12, 22) are attached to a support (e.g., PCB 40) to form the light bar 200 such that the LED clusters (12, 22) extend along a lengthwise direction of the light bar 200 from a first end E1 of the light bar to an opposite second end E2 of the light bar, and a first LED 1 at the first end E1 of the light bar and a last LED 1 at the second end E2 of the light bar are configured to emit the same color light.

Electrical connectors 50 can be provided at one side of the light bar 200 to provide an interface between the electrical wires, leads and/or printed traces on the printed circuit board 40 and a power supply socket (not shown) to which the light bar 200 is mounted. Optionally, an optical launch 14 may be provided between one of more types of light emitting devices (1, 2, 3, 4) in the light bar 200. In some embodiments, the light guiding plate 100 may include a phosphor or dye material mixed in with the silicone, polymer, and/or epoxy to generate light having a greater wavelength than the light generated from one or more types of the light emitting devices (1, 2, 3, 4). The light guiding plate 100 can be optically coupled to the light bar 200 by various mechanical couplers, such as adhesive tape or bracket.

A reflector 120 can be provided on a face of the light guide plate 100 to reflect light from the light emitting device assembly 30 to the front side of the integrated back light unit 1000. The reflector 120 can include extraction features (such as light scattering particles, ridges, and/or grooves) configured to direct light from the light emitting devices (1, 2, 3, 4) of the light bar 200 along a direction substantially perpendicular to the face of the light guide plate 100, which is herein referred to as the direction of extracted light ELD. A display unit 2000 can be provided over the light guiding plate 100, i.e., on the opposite side of the reflector 120 with respect to the light guiding plate 100. The display unit 2000 can be any type of display unit that can utilize backlight. For example, the display unit 2000 can be a liquid crystal display unit.

As shown in FIG. 2, the light emitting assembly 30 of the light bar 200 begins and ends with the same color emitting LED. Thus, the first LED at the first end E1 of the light bar 200 and the last LED at the second end E2 of the light bar is configured to emit the same color light. Thus, in operation, the end (i.e., edge) LEDs at the row of LEDs in the light bar emit the same color light. The same color light may be red, green or blue light for example. Thus, the first LED at the first end E1 of the light bar 200 and the last LED at the second end E2 of the light bar can both be one of a red-light-emitting LED, a blue-light-emitting LED or a green-light-emitting LED. For example, as shown in FIG. 2, the first LED 1 at the first end E1 of the light bar 200 and the last LED 1 at the second end E2 of the light bar are both red-light-emitting LEDs.

Figure 4:
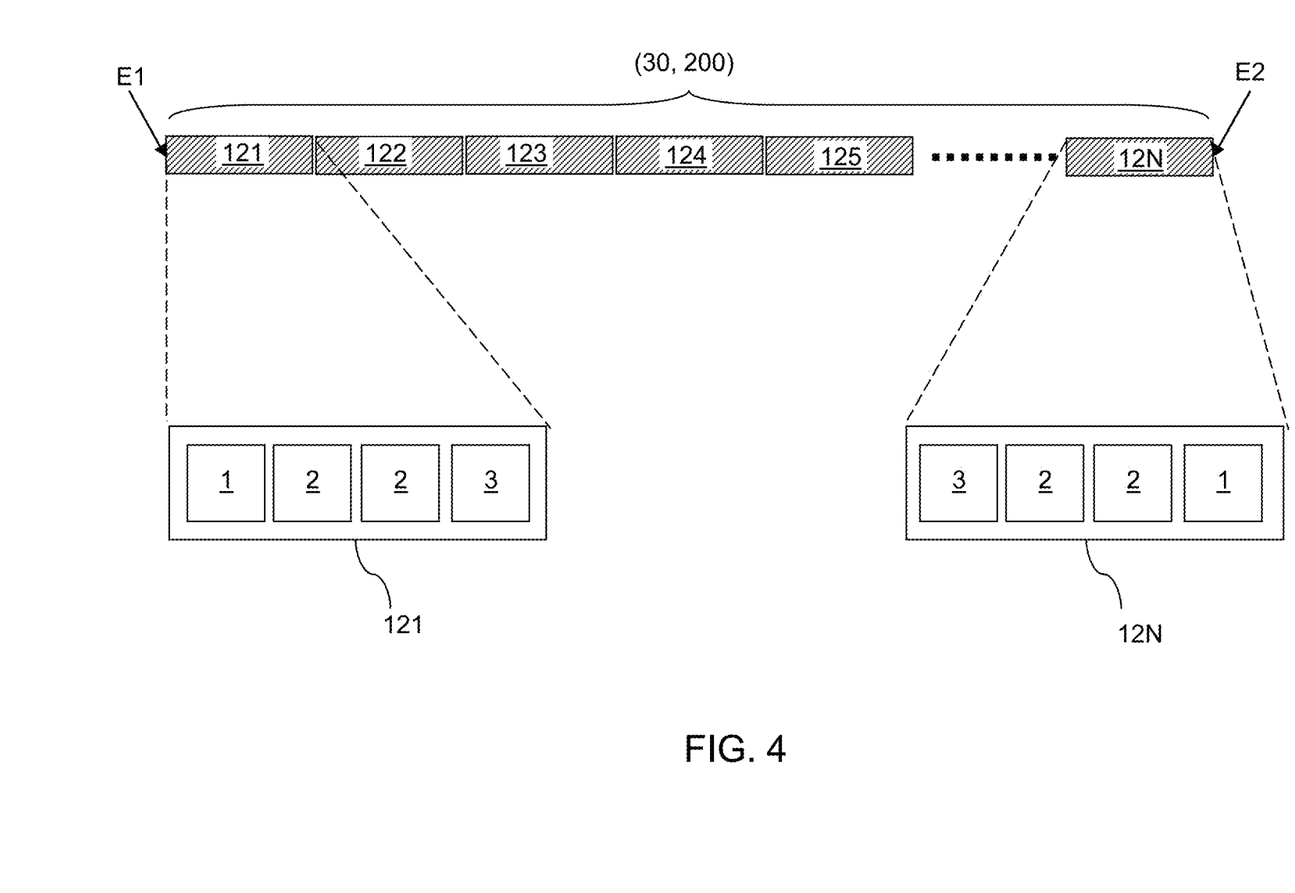
FIG. 4 is a magnified view of LED clusters in light bar according to another embodiment of the present disclosure.

FIG. 4 illustrates an alternative embodiment light emitting assembly 30 of the light bar 200. In this embodiment, the first LED at the first end E1 of the light bar 200 and the last LED at the second end E2 of the light bar emits the same color light, as in the embodiment of FIG. 2. However, in this embodiment, the light bar 200 does not necessarily have the repetition units 32. Instead the light bar 200 may contain a plurality of LED clusters 121, 122, 123, 124, 125 ... 12N (where N in any integer) having any order of LEDs, except that the first LED at the first end E1 of the light bar 200 and the last LED at the second end E2 of the light bar emits the same color light. In other words, in this embodiment, the symmetric sequence of all light emitting devices (1, 2, 3) of a repetition unit 32 can be omitted.

The chromaticity of light that is provided from the reflector 120 to the display unit 2000 has built-in non-uniformity. The non-uniformity of the chromaticity of light has three components.

The first component of the non-uniformity of the chromaticity of light is vertical non-uniformity, which is the non-uniformity along the parallel light emission directions DE, i.e., the parallel directions along which each of the light emitting devices (1, 2, 3, 4) emit light. The direction within the display unit 2000 that is parallel to the parallel light emission directions DE is herein referred to as a vertical direction. The non-uniformity of the chromaticity of light in the vertical direction of the display unit 2000 is affected by light distribution behavior that is affected directly by the distribution of light extraction features along the parallel light emission directions DE on the reflector 120, the material property of optical stacks within the display unit 2000, and light recycle behavior caused by reflection of light and affected by the material properties of the display unit 2000 (such as the nature of the liquid crystal display devices therein) and the optical properties of the light guiding plate 100.

The second component of the non-uniformity of the chromaticity is horizontal non-uniformity, which is the non-uniformity along the horizontal direction of the display unit 2000, which is the direction that is perpendicular to the vertical direction of the display unit 2000. The horizontal non-uniformity is affected by binning of the light emitting devices (1, 2, 3, 4), the beam pattern of the light emitting devices (1, 2, 3, 4), the structure of the light guiding plate 100, and the uniformity of the light extraction pattern on the reflector 120 along the horizontal direction.

The third component of the non-uniformity of the chromaticity of light is corner non-uniformity, which is the non-uniformity at edges of the display unit 2000 along the vertical direction. The corner non-uniformity is affected by the orientation of the light emitting devices (1, 2, 3, 4) (i.e., the tilt of the beam direction with respect to the vertical direction), the optics of the light emitting devices (1, 2, 3, 4), and the optical compensation provided by the material stacks of the light guiding plate 100.

The symmetric sequence of the types of light emitting devices (1, 2, 3 and optionally 4) within the repetition unit 32 of the present disclosure (e.g., shown in FIG. 2) and/or having the same color light emitting LED at opposite edges of the light bar (e.g., as shown in FIGS. 2 and 4) reduces corner non-uniformity, i.e., enhances corner uniformity. In other words, edges of the display unit 2000 along the vertical direction provide matched chromaticity of light so that the overall uniformity of chromaticity can be improved across the display unit 2000 of the present disclosure relative to overall uniformity of chromaticity that can be achieved on a display unit overlying a prior art integrated back light unit. In other words, the integrated back light unit 1000 of the present disclosure provides more uniform chromaticity of light across the entirety of the display unit 2000 that prior art integrated back light units.

Figure 5:
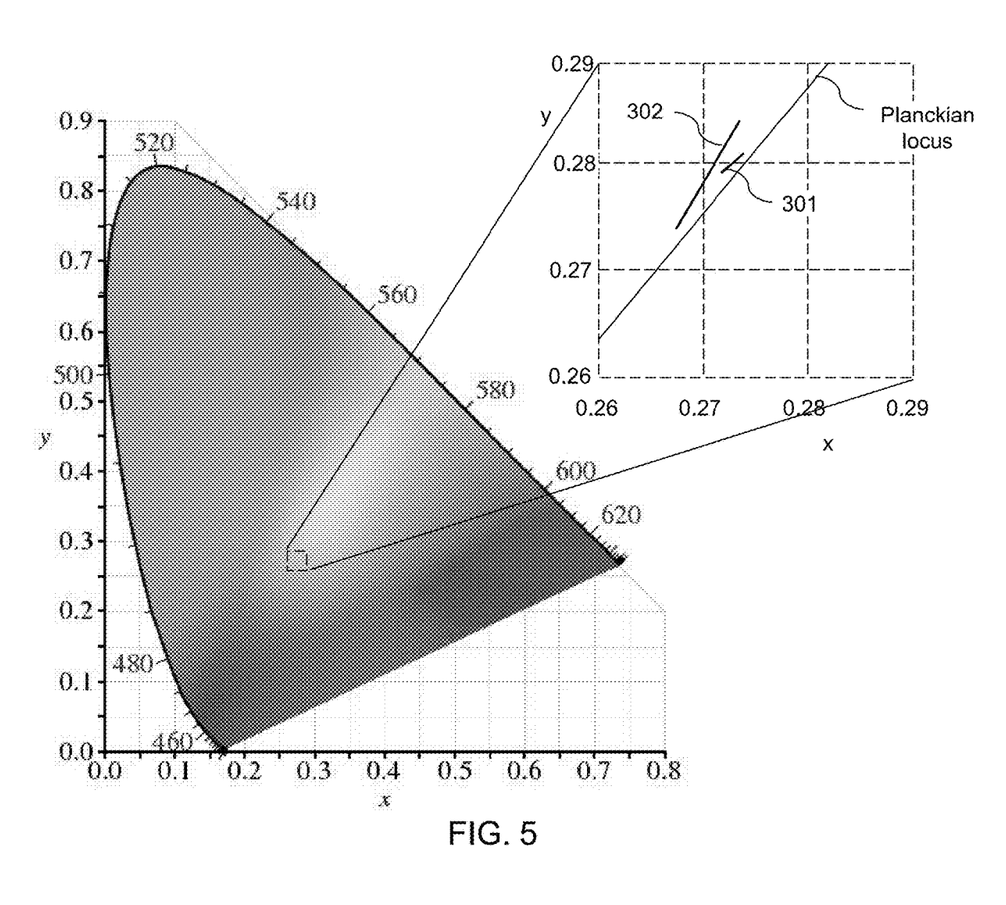
FIG. 5 is a schematic illustration of color variations across a display screen for two exemplary devices employing a LED light bar of the present disclosure and a comparative exemplary LED light bar on a CIE 1931 chromaticity diagram.

An example of performance enhancement through use of the integrated back light unit 1000 of the present disclosure is illustrated in FIG. 5. FIG. 5 shows a first locus 301 encompassing all chromaticity variations across 135 measurement points on a display unit 2000 overlying an integrated back light unit 1000 of the present disclosure. The display unit 2000 has a rectangular shape with a length (along a vertical direction) of about 6 inches and a width (along a horizontal direction) of about 4 inches. The repetition unit 32 illustrated in FIG. 2 is employed for the integrated back light unit 1000 in this case. The first-type light emitting device 1 is a red-light-emitting LED, the second-type light emitting device 2 is a green-light-emitting LED, and the third-type light emitting device 3 is a blue-light-emitting LED. The first locus 301 has a range in CIEx of about 0.022 and a range in CIEy of about 0.022.

FIG. 5 also shows a second locus 302 encompassing all chromaticity variations across 135 measurement points on a display unit overlying a comparative integrated back light unit according to prior art. The comparative display unit is of the same type as the display unit 2000 that generates the first locus 301. Multiple instances of a unit consisting of, from one side to another, an instance of a red-light-emitting LED, two instances of a green-light-emitting LED, and an instance of a blue-light-emitting LED are repeated in the light emitting device assembly of the comparative integrated back light unit. The same order of light emitting devices is employed within instance of the unit in the light emitting device assembly of the comparative integrated back light unit, such that the assembly (e.g., light bar) begins and ends with different color emitting LEDs (i.e., has different color LEDs at opposite ends E1 and E2). The second locus 302 has a range in CIEx of about 0.06 and a range in CIEy of about 0.12.

The significant reduction in the ranges of CIEx and CIEy in the first locus 301 with respect to the second locus 302 is primarily by matching of the chromaticity variations at the lengthwise edges of the display unit 2000. Thus, corner uniformity of a display screen on an integrated back light unit can be enhanced by employing a light bar including multiple instances of a repetition unit that provides a symmetric light spectrum distribution through the symmetric sequence in the repetition unit 32 in the light emitting device assembly 30.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art.

What is claimed is:

1. A light bar comprising multiple instances of a repetition unit, wherein:
   the multiple instances of the repetition unit extend along a lengthwise direction of the light bar from a first end of the light bar to an opposite second end of the light bar;
   the multiple instances of the repetition unit are periodically positioned, and are oriented to emit light along parallel light emission directions that are perpendicular to the lengthwise direction of the light bar;
   the repetition unit includes at least eight light emitting diodes containing at least three types of light emitting devices; and
   an entire sequence of all light emitting devices within the repetition unit from one end of the repetition unit to the other end of the repetition unit is a symmetric sequence in which a reverse sequence of the symmetric sequence is identical to the symmetric sequence, and which provides a symmetric light spectrum distribution about a center of the symmetric sequence, wherein the repetition unit comprises:
a first light emitting device cluster including a first sequence of instances of the at least three types of light emitting devices; and
a second light emitting device cluster located adjacent to the first light emitting device cluster and including a second sequence of instances of the at least three types of light emitting devices that is a reverse sequence of the first sequence; and
wherein the second sequence is different from the first sequence.

2. The light bar of claim 1, wherein the repetition unit consists of the first sequence and the second sequence, and the repetition unit includes eight or ten light emitting diodes.

3. The light bar of claim 1, wherein:
the first sequence includes, in order:
an instance of a first-type light emitting device configured to emit light at a first peak wavelength;
two instances of a second-type light emitting device configured to emit light at a second peak wavelength; and
an instance of a third-type light emitting device configured to emit light at a third peak wavelength; and
the second wavelength is shorter than the first wavelength and longer than the third wavelength.

4. The light bar of claim 3, wherein:
the first-type light emitting device is a red-light-emitting light emitting diode (LED);
the second-type light emitting device is a green-light-emitting LED; and
the third-type light emitting device is a blue-light-emitting LED.

5. The light bar of claim 4, wherein each of the first sequence and the second sequence includes two green-light-emitting LEDs, only a single instance of the red-light-emitting LED and only a single instance of the blue-light-emitting LED.

6. The light bar of claim 1, wherein the repetition unit consists of the first light emitting device cluster and the second light emitting device cluster.

7. The light bar of claim 1, wherein each of the first light emitting device cluster and the second light emitting device cluster includes a respective set of lead structures configured to provide electrical connection to instances of the at least three types of light emitting devices therein.

8. The light bar of claim 7, wherein each of the first light emitting device cluster and the second light emitting device cluster includes a dielectric molding embedding the respective set of lead structures and the instances of the at least three types of light emitting devices therein.

9. The light bar of claim 1, wherein a first light emitting device at the first end of the light bar and a last light emitting device at the second end of the light bar are configured to emit the same color light.

10. The light bar of claim 9, wherein the first light emitting device and the last light emitting device both comprise the same one of a red-light-emitting LED, a blue-light-emitting LED or a green-light-emitting LED.

11. The light bar of claim 9, wherein the first light emitting device is a red-light-emitting LED and the last light emitting device is a red-light-emitting LED.

12. An integrated back light unit, comprising:
the light bar of claim 1;
a light guide plate optically coupled to the light bar; and
a reflector located on a face of the light guide plate and including extraction features configured to direct light from the light emitting devices of the light bar along a direction substantially perpendicular to the face of the light guide plate.

13. The light bar of claim 1, wherein the at least three types of light emitting devices comprise:
a first-type LED configured to emit light at a first peak wavelength;
a second-type LED configured to emit light at a second peak wavelength which is longer than the first peak wavelength; and
a third-type LED configured to emit light at a third peak wavelength which is longer than the first and the second peak wavelengths,
wherein a first LED at the first end of the light bar and a last LED at the second end of the light bar are configured to emit the same color light.

14. The light bar of claim 13, wherein the first LED and the last LED both comprise the same one of a red-light-emitting LED, a blue-light-emitting LED or a green-light-emitting LED.

15. The light bar of claim 13, wherein the first LED is a red-light-emitting LED and the last LED is a red-light-emitting LED.

16. An integrated back light unit, comprising:
the light bar of claim 13;
a light guide plate optically coupled to the light bar; and
a reflector located on a face of the light guide plate and including extraction features configured to direct light from the light emitting devices of the light bar along a direction substantially perpendicular to the face of the light guide plate.

17. A method of making a light bar, comprising:
separately fabricating a plurality of light emitting diode (LED) clusters, wherein each LED cluster includes at least three different types of LEDs; and
attaching the plurality of LED clusters to a support to form the light bar such that the light bar comprises multiple instances of a repetition unit that is an LED cluster, wherein:
the multiple instances of the repetition unit extend along a lengthwise direction of the light bar from a first end of the light bar to an opposite second end of the light bar;
the multiple instances of the repetition unit are periodically positioned, and are oriented to emit light along parallel light emission directions that are perpendicular to the lengthwise direction of the light bar;
the repetition unit includes at least three types of light emitting devices; and
an entire sequence of all light emitting devices within the repetition unit from one end of the repetition unit to the other end of the repetition unit is a symmetric sequence in which a reverse sequence of the symmetric sequence is identical to the symmetric sequence, and which provides a symmetric light spectrum distribution about a center of the symmetric sequence,
wherein the repetition unit comprises:
a first light emitting device cluster including a first sequence of instances of the at least three types of light emitting devices; and
a second light emitting device cluster located adjacent to the first light emitting device cluster and including a second sequence of instances of the at least three types of light emitting devices that is a reverse sequence of the first sequence; and wherein the second sequence is different from the first sequence.

18. The method of claim 17, wherein:

the support comprises a printed circuit board; and the first LED and the last LED both comprise the same one of a red-light-emitting LED, a blue-light-emitting LED or a green-light-emitting LED.

19. The light bar of claim 1, wherein each of the first sequence and the second sequence comprises:

a first-type LED configured to emit light at a first peak wavelength;

a second-type LED configured to emit light at a second peak wavelength which is longer than the first peak wavelength; and a third-type LED configured to emit light at a third peak wavelength which is longer than the first and the second peak wavelengths.

* * * * *